(12) United States Patent
Kanao et al.

(10) Patent No.: US 6,334,339 B1
(45) Date of Patent: Jan. 1, 2002

(54) HOODED TORCH FOR SYNTHESIZING GLASS PARTICULATES

(75) Inventors: Akihiro Kanao, Chiba; Toshihiro Mikami, Tochigi, both of (JP)

(73) Assignee: The Furukawa Electric Co., Ltd., Tokyo (JP)

(*) Notice: Subject to any disclaimer, the term of this patent is extended or adjusted under 35 U.S.C. 154(b) by 0 days.

(21) Appl. No.: 09/598,893

(22) Filed: Jun. 22, 2000

(51) Int. Cl.⁷ .............................................. C04B 37/18
(52) U.S. Cl. ............................. 65/531; 65/414; 65/421; 239/422; 239/423; 239/424.5
(58) Field of Search .......................... 65/531, 414, 421; 239/422, 423, 424.5

(56) References Cited

U.S. PATENT DOCUMENTS

| 4,389,235 | A | * | 6/1983 | Jung | 65/302 |
| 4,765,815 | A | * | 8/1988 | Danzuka et al. | 65/414 |
| 5,735,928 | A | * | 4/1998 | Sayce et al. | 65/531 |
| 5,922,100 | A | * | 7/1999 | Cain et al. | 65/531 |
| 5,979,185 | A | * | 11/1999 | Blackwell et al. | 65/421 |

FOREIGN PATENT DOCUMENTS

| EP | 0 237183 | * | 7/1987 | 65/414 |
| GB | 2 124205 | * | 2/1984 | 65/414 |
| JP | 62-162637 | * | 7/1987 | |
| JP | 2000-191337 | * | 7/2000 | |

OTHER PUBLICATIONS

Abstract of JP 62–162637, Jul. 1987.*
Abstract of JP 2000–191337, Jul. 2000.*

* cited by examiner

Primary Examiner—James Derrington
(74) Attorney, Agent, or Firm—Oblon, Spivak, McClelland, Maier & Neustadt, P.C.

(57) ABSTRACT

A hooded glass particulate synthesizing torch, provided with at least a glass particulate synthesizing torch body having a feedstock gas injection passage formed at the center of its front end, a combustible gas injection passage formed concentrically at the outer circumference of the feedstock gas injection passage, and a plurality of small diameter combustion aid gas injection passages formed in the combustible gas injection passage along the outer circumference of the feedstock gas injection passage and a hood projecting out at the outer circumference of the front end of the torch body, the torch hood satisfying $0.5 \leq D/L \leq 2.0$, where, L is the focal distance, that is, a distance from a point P, to which the small diameter combustion aid gas injection passages are directed and on an extension of the center line of the torch body in front of the torch body, to the front end of the torch body, and D is the hood length, that is, the distance from the front end of the hood to the front end of the torch body.

1 Claim, 5 Drawing Sheets

HOODED TORCH FOR SYNTHESIZING GLASS PARTICULATES

BACKGROUND OF THE INVENTION

1. Field of the Invention

The present invention relates to a hooded torch for synthesizing glass particulates used when producing a porous glass preform by a VAD process, an OVD process, or the like.

2. Description of the Related Art

FIG. 1 is a view of the configuration of torches of the related art used for producing (synthesizing) a porous glass preform 1 by the VAD process.

The apparatus illustrated in FIG. 1 uses a hooded core glass particulate synthesizing torch 2 for forming a core portion 1a of the porous glass preform 1 and a hooded cladding glass particulate synthesizing torch 3 for forming a clad portion 1b of the porous glass preform 1 so as to deposit glass particulates synthesized by a flame hydrolysis reaction in the flames 4 and 5 of the torches 2 and 3 on the lower end of a rotating, rising porous glass preform 1. The hooded glass particulate synthesizing torch 2 is comprised of a glass particulate synthesizing torch body 2A and a hood 7 provided so as to project out at an outer circumference of the front end of the torch body 2A. Also the hooded glass particulate synthesizing torch 3 is comprised of a glass particulate synthesizing torch body 6 and a hood 7 provided so as to project out at the outer circumference of the front end of the torch body 6.

FIG. 2 is a view of the configuration of another torch of the related art for producing (synthesizing) a porous glass preform 9 on the outer circumference of a vitrified starting material 8 (frequently used for core) by the OVD process.

The apparatus illustrated in FIG. 2 uses a torch for forming a porous glass preform 9, that is, a hooded glass particulate synthesizing torch 3 having a structure similar to that mentioned before, to deposit glass particulates synthesized by a flame hydrolysis reaction in the flame 5 of the torch 3 on the outer circumference of the starting material 8 rotating around a center axial line. Further, it either makes the starting material 8 reciprocally move in a direction of its center axial line or makes the hooded glass particulate synthesizing torch 3 reciprocally move in a longitudinal direction of the starting material 8.

Both of the porous glass preforms 1 and 9 formed by the apparatuses illustrated in FIG. 1 and FIG. 2 are then heat treated for dehydration, then vitrified to make transparent optical fiber preforms.

The transparent porous glass preform is then heated and drawn to make for example a single mode optical fiber comprised of a core with a diameter of 10 $\mu$m and a cladding with a diameter of 125 $\mu$m formed on the outer circumference of the core.

In the hooded glass particulate synthesizing torch 3 of the related art used in the VAD process and the OVD process, however, the projection length D of the hood 7 from the front end of the torch body 6 was determined by the outer diameter of the torch body 6 or the flow rate of the feedstock gas, but there were problems in cost and yield such as the deposition effect being insufficient or glass particulates 10 depositing on the inner wall of the hood 7 as shown in FIG. 1.

SUMMARY OF THE INVENTION

An object of the present invention is to provide a hooded glass particulate synthesizing torch capable of improving the deposition effect and capable of improving the yield.

According to the present invention, there is provided a hooded glass particulate synthesizing torch provided with at least a glass particulate synthesizing torch body having a feedstock gas injection passage formed at the center of its front end, a combustible gas injection passage formed concentrically at the outer circumference of the feedstock gas injection passage, and a plurality of small diameter combustion aid gas injection passages formed in the combustible gas injection passage along the outer circumference of the feedstock gas injection passage and a hood projecting out at the outer circumference of the front end of the torch body.

In the hooded glass particulate synthesizing torch according to the present invention, use is made of a hood having a length satisfying the condition of the following relation:

$$0.5 \leq D/L \leq 2.0$$

where L is the focal distance, that is, a distance from a point P, to which the small diameter combustion aid gas injection passages are directed and on an extension of the center line of the torch body in front of the torch body, to the front end of the torch body, and D is the hood length, that is, the distance from the front end of the hood to the front end of the torch body.

BRIEF DESCRIPTION OF THE DRAWINGS

These and other objects and features of the present invention will become more apparent from the following description of the preferred embodiments given with reference to the accompanying drawings, wherein.

DESCRIPTION OF THE PREFERRED EMBODIMENTS

First Embodiment

Figure 3:
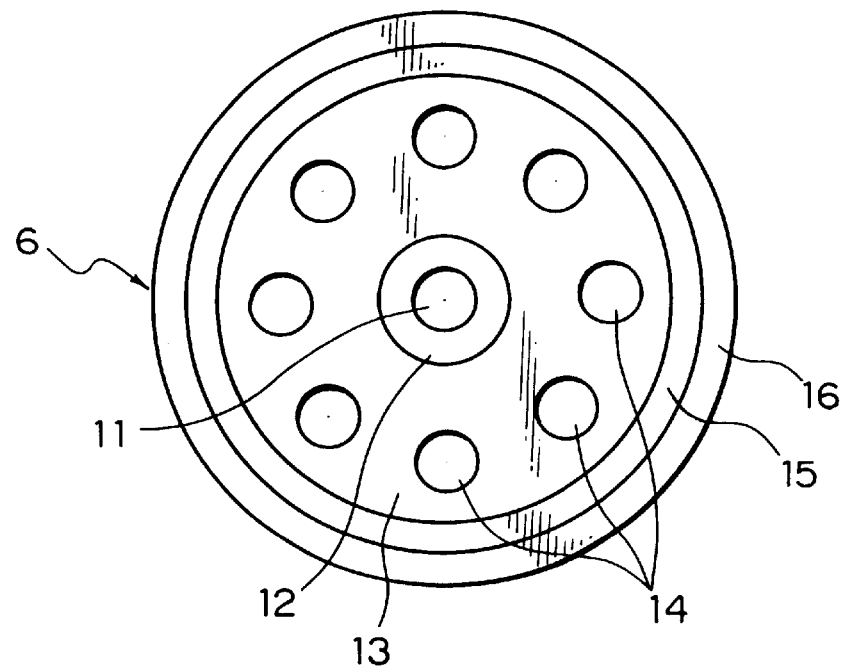
FIG. 3 is a front view of a glass particulate synthesizing torch body used in a hooded glass particulate synthesizing torch according to a first embodiment of the present invention.

FIG. 3 is a front view of a glass particulate synthesizing torch body used in a hooded glass particulate synthesizing torch according to a first embodiment of the present invention.

This glass particulate synthesizing torch body 6 is provided with a feedstock gas injection passage 11 formed at the center of the front end, a seal gas injection passage 12 formed concentrically in the outer circumference of the feedstock gas injection passage 11, a combustible gas injection passage 13 formed concentrically at the outer circumference of the seal gas injection passage 12, a plurality of small diameter combustion aid gas injection passages 14 formed in this combustible gas injection passage 13 along the outer circumference of the feedstock gas injection passage 11 (in this case, along the outer circumference of the seal gas injection passage 12 since the seal gas injection passage 12 exists), a seal gas injection passage 15 formed at the outer circumference of the combustible gas injection passage 13, and a combustion aid gas injection passage 16 formed at the outer circumference of the seal gas injection passage 15.

Figure 4:
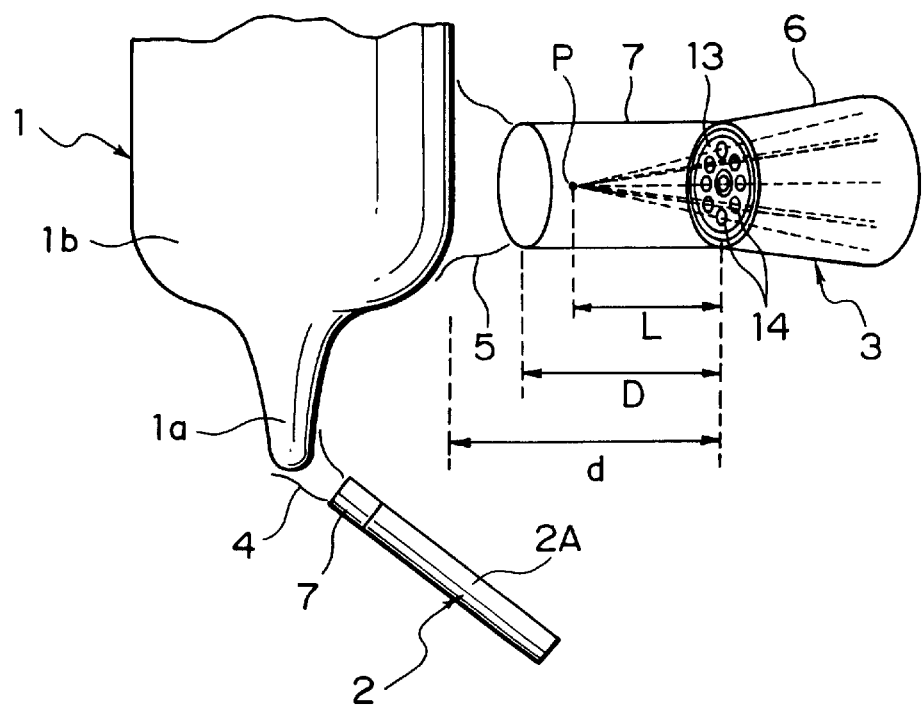
FIG. 4 is a perspective view of the hooded glass particulate synthesizing torch for producing a porous glass preform by the VAD process according to the first embodiment of the present invention.

FIG. 4 is a perspective view of the hooded glass particulate synthesizing torch 3 for producing a porous glass preform 1 by the VAD process according to the first embodiment of the present invention.

The hooded glass particulate synthesizing torch 3 of the first embodiment is provided with the glass particulate synthesizing torch body 6 having the structure shown in FIG. 3 and a hood 7 projecting out at the outer circumference of the front end of the torch body 6.

Note that, in the embodiments of the present invention as well, L indicates the focal distance, that is, the distance from a point P, to which the small diameter combustion aid gas injection passages are directed and on an extension of the center line of the torch body in front of the torch body, to the front end of the torch body, and D is the hood length, that is, the distance from the front end of the hood to the front end of the torch body.

Further, in the examples of the present invention and the related art, a distance d between the front end surface of the torch body 6 and the surface of the porous glass preform 1 is made the same condition between the present invention and the related art corresponding to this. Concretely, the distance d is set within a range of from 1 to 2.5 times the focal distance L. This is because, in this range, the material yield is relatively high irrespective of existence/nonexistence of the hood 7. Further, the difference between the distance d and the hood length D (d–D) is usually controlled to 30 mm or more. When controlled in this way, the deposition of glass particulates onto the inner surface of the hood 7 due to a too close distance d can be prevented.

The hooded glass particulate synthesizing torch 3 of this example uses a hood 7 having a hood length D=130 mm with respect to a torch body 6 having the focal distance L=80 mm, that is, a hood 7 of D/L=1.63. As a result, a porous glass preform 1 having an outer diameter of 150 mm can be manufactured at a growth rate of 70 mm/h without deposition of the glass particulates on the inner wall of the hood 7 and a material yield of about 70% can be obtained. Further, the porous glass preform 1 can be manufactured without deformation or cracking.

Second Embodiment

Figure 5:
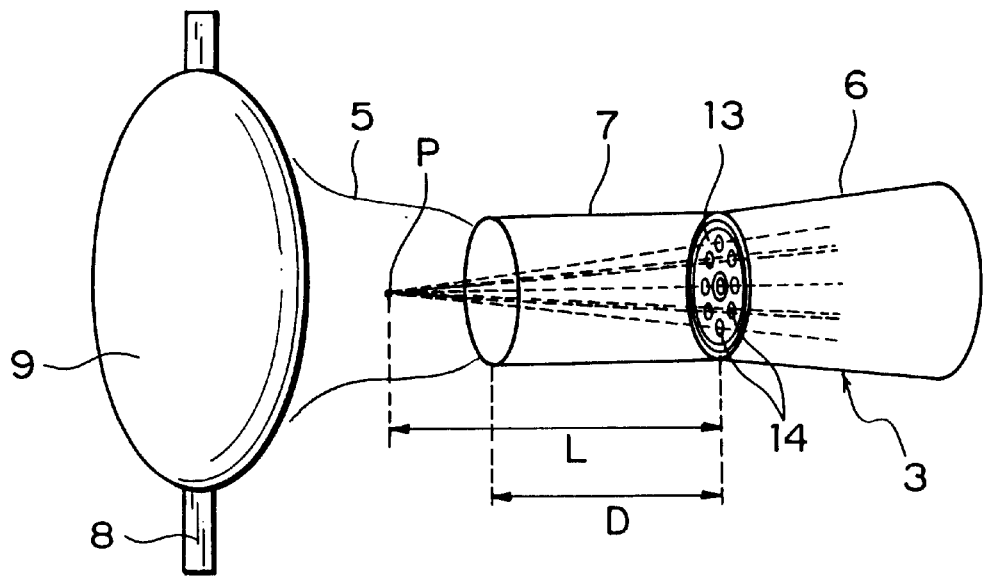
FIG. 5 is a perspective view of a hooded glass particulate synthesizing torch for producing a porous glass preform by the OVD process according to a second embodiment of the present invention.

FIG. 5 is a view of a hooded glass particulate synthesizing torch 3 for producing a porous glass preform 9 by the OVD process at the outer circumference of the starting material 8 according to a second embodiment of the present invention.

The hooded glass particulate synthesizing torch 3 of the second embodiment is also provided with a glass particulate synthesizing torch body 6 having the structure shown in FIG. 3 and a hood 7 projecting out at the outer circumference of the front end of the torch body 6.

The hooded glass particulate synthesizing torch 3 of the second embodiment uses a hood 7 having a hood length D=160 mm with respect to a torch body 6 having a focal distance L=180 mm, that is, a hood with a D/L=0.89. As a result, a porous glass preform 1 having an outer diameter of 250 mm can be manufactured at a deposition rate of 15 g/min without deformation or cracking.

Third Embodiment

Figure 6:
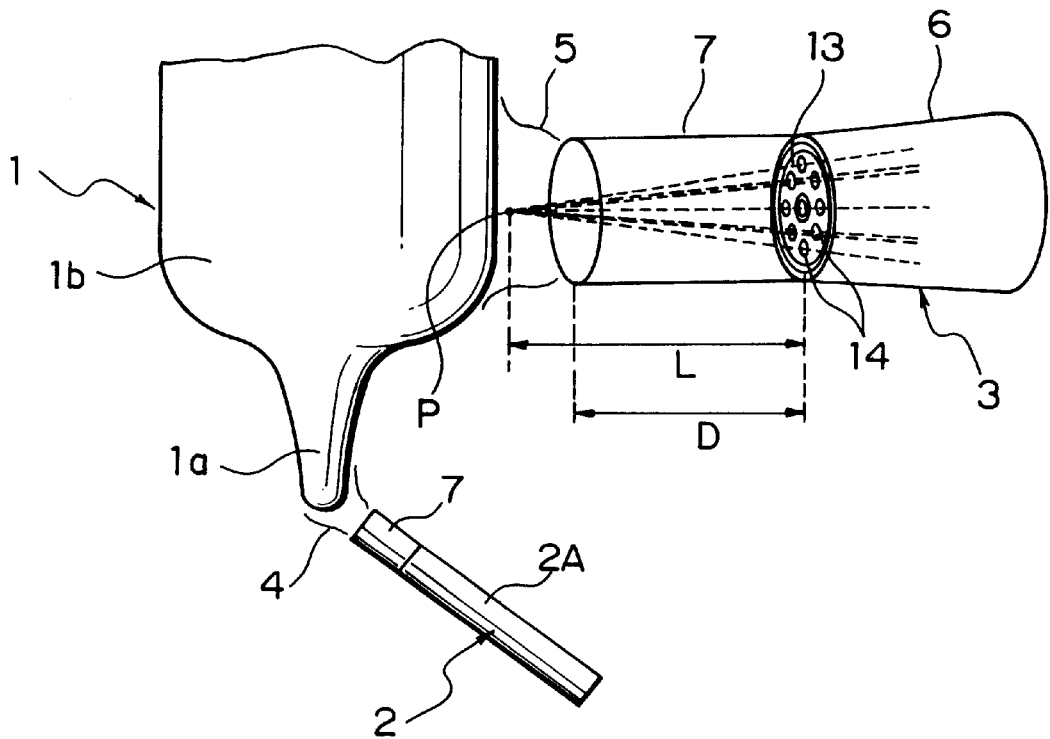
FIG. 6 is a perspective view of a hooded glass particulate synthesizing torch for producing a porous glass preform by the VAD process according to a third embodiment of the present invention.

FIG. 6 is a view of a hooded glass particulate synthesizing torch 3 for producing a porous glass preform 1 by the VAD process according to a third embodiment of the present invention.

The hooded glass particulate synthesizing torch 3 of the third embodiment is also provided with a glass particulate synthesizing torch body 6 having the structure shown in FIG. 3 and a hood 7 projecting out at the outer circumference of the front end of the torch body 6.

The hooded glass particulate synthesizing torch 3 of the third embodiment uses a hood 7 having a hood length D=120 mm with respect to a torch body 6 having a focal distance L=160 mm, that is, a hood with a D/L=0.75. As a result, a porous glass preform 1 having an outer diameter of at least 150 mm can be manufactured at a deposition rate of 75 g/min and a material yield of 65%. Also, the porous glass preform 1 can be manufactured without deformation and cracking.

Fourth Embodiment

Figure 7:
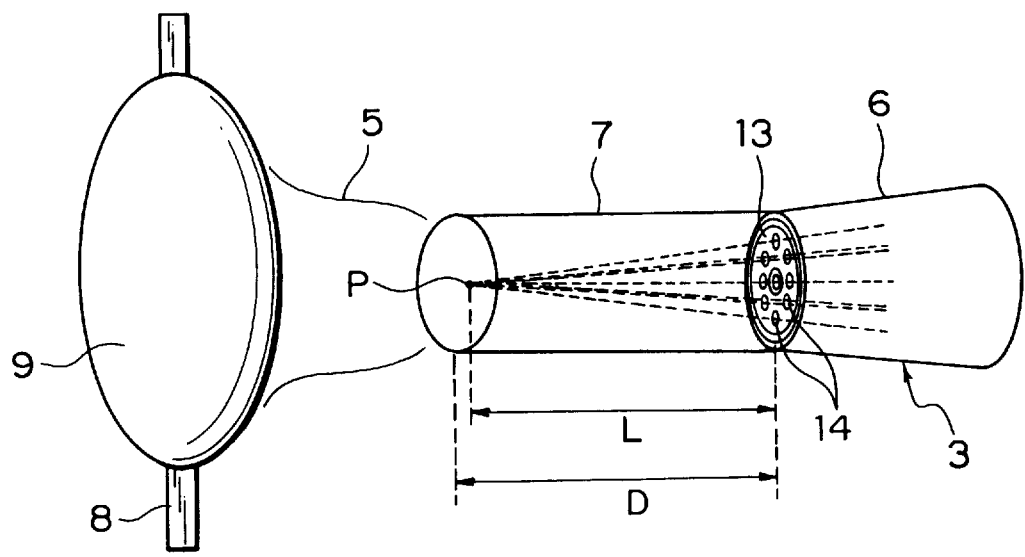
FIG. 7 is a perspective view of a hooded glass particulate synthesizing torch for producing a porous glass preform by the OVD process according to a fourth embodiment of the present invention.

FIG. 7 is a view of a hooded glass particulate synthesizing torch 3 for producing a porous glass preform 9 by the OVD process at the outer circumference of the starting material 8 according to a fourth embodiment of the present invention.

The hooded glass particulate synthesizing torch 3 of the fourth embodiment is also provided with a glass particulate synthesizing torch body 6 having the structure shown in FIG. 3 and a hood 7 projecting out at the outer circumference of the front end of the torch body 6.

The hooded glass particulate synthesizing torch 3 of the fourth embodiment uses a hood 7 having a hood length D=200 mm with respect to a torch body 6 having a focal distance L=160 mm, that is, a hood with a D/L=1.25. As a result, a porous glass preform 1 having an outer diameter of 250 mm can be manufactured at a deposition rate of 16 g/min without deformation or cracking.

Summary of Embodiments of Present Invention

Summarizing the embodiments explained above, the hooded glass particulate synthesizing torch according to the present invention stands the following relation:

$$0.5 \leq D/L \leq 2.0$$

where L is the focal distance, that is, a distance from a point P, to which the small diameter combustion aid gas injection passages are directed and on an extension of the center line of the torch body in front of the torch body, to the front end of the torch body, and D is the hood length, that is, the distance from the front end of the hood to the front end of the torch body.

When using such a torch, the glass material ejected from the glass particulate synthesizing torch becomes glass particulates by the flame hydrolysis reaction and are deposited on the front end of the porous glass preform and the outer circumference of the starting material. At this time, the longer the reaction distance at the front end of the torch body, in other words, the longer the length of the flame, the more the promotion of the flame hydrolysis reaction. This leads to the improvement of the reaction efficiency. Therefore, generally development has been directed to structural improvements such as the bore of the torch body or the focal distance L of the small diameter combustion aid gas injection passages. At this time, if the hood length D of the hood used for improving the directivity of the flame is too long, the glass particulates promoted in reaction will deposit on the inner wall of the hood and cause clogging and deformation of the hood. Conversely, if the projection length D from the front end of the torch body of the hood is too short, the initial object of the present invention of raising the directivity of the flame no longer can be achieved.

As mentioned above, according to experiments by the present inventors, when a hood having a hood length D satisfying the condition of $0.5 \leq D/L \leq 2.0$ is used, the directivity of the flame can be raised and, at the same time, the deposition of the glass particulates on the inner wall of the hood can be prevented, thus the deposition efficiency of the porous glass preform can be raised, and the porous glass preform can be produced with a high yield. Further, if D/L is larger than 2.0, the hood length D is too long, the glass particulates promoted in reaction will deposit on the inner wall of the hood and cause clogging and deformation of the hood. Further, if D/L is smaller than 0.5, the hood length D is too short and the directivity of the flame is not improved, so the initial object of attaching the hood no longer can be achieved.

COMPARATIVE EXAMPLES

As comparative examples, an explanation will be made of the results of producing the porous glass preform 9 by using the hooded glass particulate synthesizing torches 3 of the related art shown in FIG. 1 and FIG. 2 mentioned before.

Figure 1:
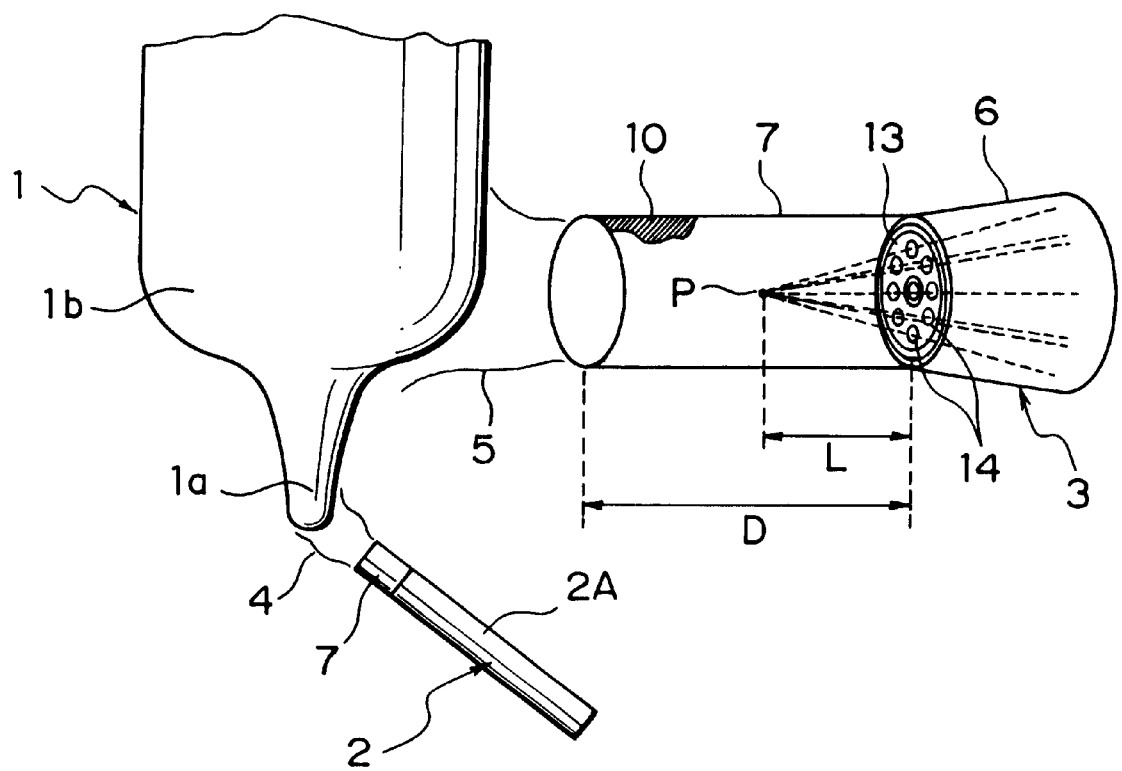
FIG. 1 is a perspective view of the configuration of torches of the related art for producing a porous glass preform by the VAD process.

The hooded glass particulate synthesizing torch 3 of the related art shown in FIG. 1 used a hood 7 having a hood length D=250 mm with respect to a torch body 6 having a focal distance L=120 mm, that is, a hood 7 of D/L=2.08, for producing a porous glass preform 1 by the VAD process. As a result, the reaction progressed in the hood 7 and therefore the glass particulates deposited on the inner wall of the hood 7 and the porous glass preform 9 could not be produced.

Figure 2:
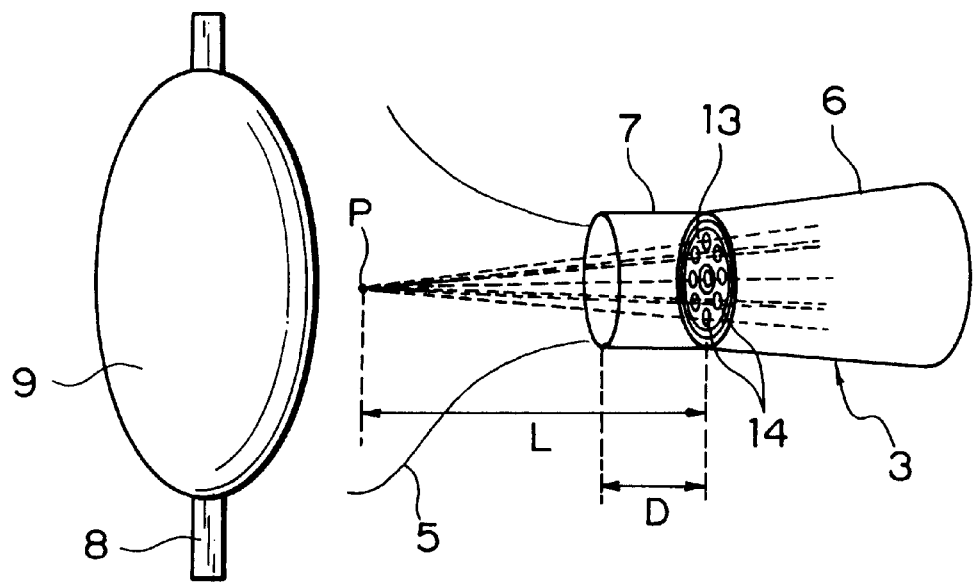
FIG. 2 is a perspective view of the configuration of another torch of the related art for producing a porous glass preform by the OVD process.

The hooded glass particulate synthesizing torch 3 of the related art shown in FIG. 2 used a hood 7 having a hood length D=80 mm with respect to a torch body 6 having a focal distance L=180 mm, that is, a hood 7 of D/L=0.44, for producing a porous glass preform 1 by the OVD process. As a result, the directivity of the flame was low, therefore the material yield was an insufficient 50% or less, and the defect rate such as failure of the porous glass preform 9 to become the intended shape or cracking of the porous glass preform 9 due to thermal distortion was a high 50% or so.

General Results

Figure 8:
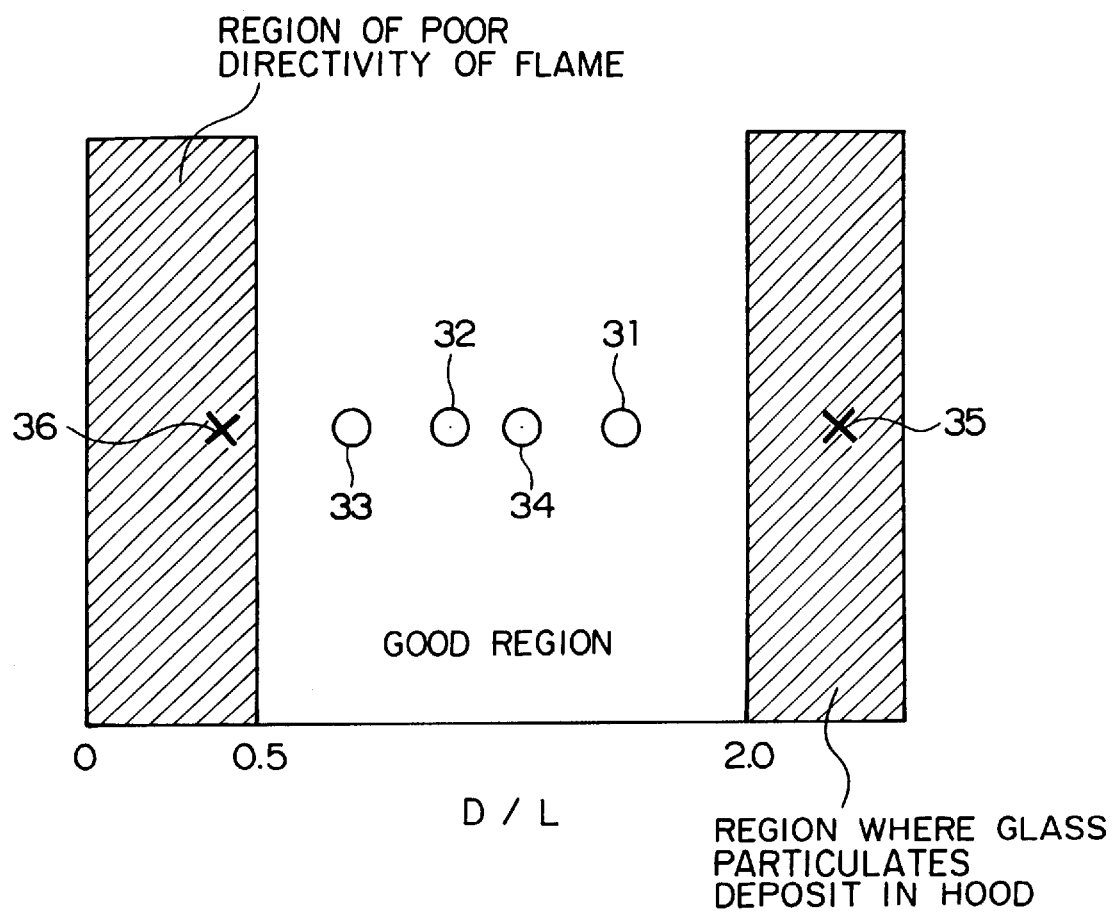
FIG. 8 is a graph of the results of experiments for producing a porous glass preform by using the hooded glass particulate synthesizing torches of the embodiments of the present invention with different D/L ratios and hooded glass particulate synthesizing torches of the related art.

FIG. 8 is a graph of the general results of the experiments described above. In FIG. 8, a hooded glass particulate synthesizing torch 3 with D/L=1.63 of the first embodiment shown in FIG. 4 is indicated as a torch 31, a hooded glass particulate synthesizing torch 3 with D/L=0.89 of the second embodiment shown in FIG. 5 is indicated as a torch 32, a hooded glass particulate synthesizing torch 3 with D/L=0.75 of the third embodiment shown in FIG. 6 is indicated as a torch 33, a hooded glass particulate synthesizing torch 3 with D/L=1.25 of the fourth embodiment shown in FIG. 7 is indicated as a torch 34, a hooded glass particulate synthesizing torch 3 with D/L=2.08 of the related art shown in FIG. 1 is indicated as a torch 35, and a hooded glass particulate synthesizing torch 3 with D/L=0.44 of the related art shown in FIG. 2 is indicated as a torch 36.

As apparent from FIG. 8, when D/L is within the range represented by $0.5 \leq D/L \leq 2.0$, the porous glass preforms 1 and 9 can be produced well, but if D/L becomes smaller than 0.5, the directivity of the flame is lowered and the porous glass preforms 1 and 9 cannot produced well. If D/L becomes larger than 2.0, the glass particulates deposit in the hood 7 and the porous glass preforms 1 and 9 can no longer be produced well.

Other Embodiments

Figure 9A:
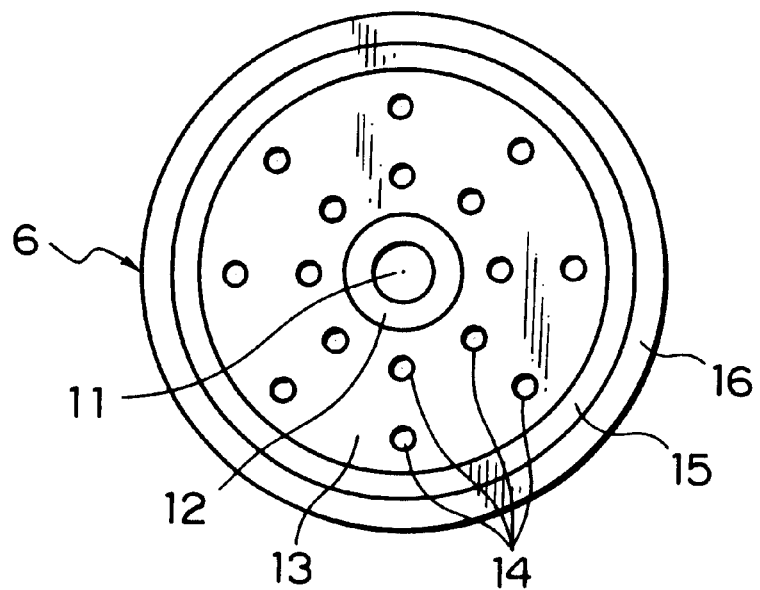
FIGS. 9A and 9B are front views of examples of two other types of glass particulate synthesizing torch bodies used in the hooded glass particulate synthesizing torches of the present invention.
Figure 9B:
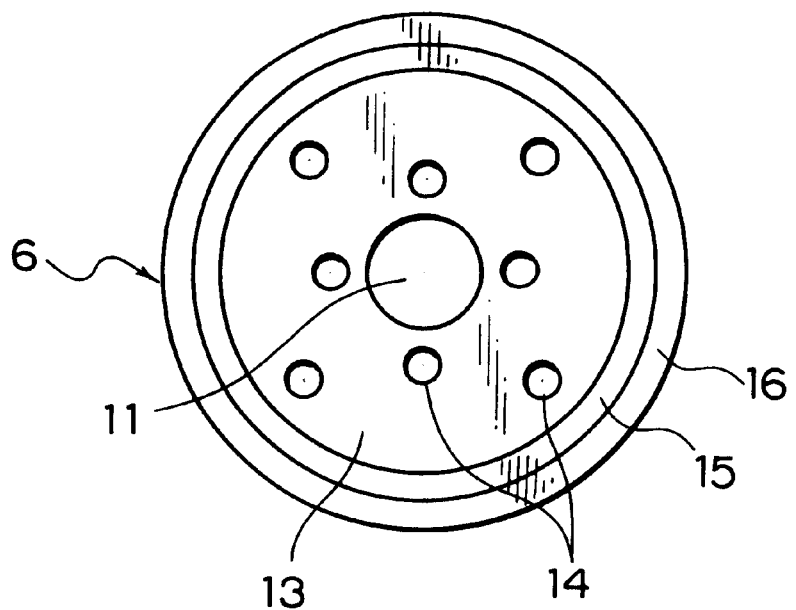

FIGS. 9A and 9B show examples of two other types of glass particulate synthesizing torch bodies 6 used in the hooded glass particulate synthesizing torch 3 of the present invention.

The torch body 6 shown in FIG. 9A is different from the torch body 6 shown in FIG. 3 in the point that the plurality of combustion aid gas injection passages 14 arranged in the combustible gas injection passage 13 are provided in two concentric circles with different radiuses from the center of the feedstock gas injection passage 11.

The torch body 6 shown in FIG. 9B is different from the torch body 6 shown in FIG. 9A in the point that the seal gas injection passage 12 is omitted.

Even in the hooded glass particulate synthesizing torch 3 using such a torch body 6 shown in FIGS. 9A and 9B, by setting D/L within the range represented by $0.5 \leq D/L \leq 2.0$, effects similar to those of the case where D/L is set within the range of $0.5 \leq D/L \leq 2.0$ in the hooded glass particulate synthesizing torch 3 using the torch body 6 shown in FIG. 3 can be obtained.

In the above embodiments, the explanation was made of the example where the present invention was applied to a hooded glass particulate synthesizing torch 3, but the present invention can be similarly applied to also the hooded glass particulate synthesizing torch 2.

In the hooded glass particulate synthesizing torch according to the present invention, use is made of a hood having a length satisfying the condition of $0.5 \leq D/L \leq 2.0$ where L is the focal distance, that is, a distance from a point P, to which the small diameter combustion aid gas injection passages are directed and on an extension of the center line of the torch body in front of the torch body, to the front end of the torch body, and D is the hood length, that is, the distance from the front end of the hood to the front end of the torch body, so the directivity of the flame can be raised and, at the same time, the deposition of the glass particulates on the inner wall of the hood can be prevented, the deposition effect of the porous glass preform can be raised, and the porous glass preform can be manufactured with a high yield.

While the invention has been described by reference to specific embodiments chosen for purposes of illustration, it should be apparent that numerous modifications could be made thereto by those skilled in the art without departing from the basic concept and scope of the invention.

What is claimed is:

1. A hooded glass particulate synthesizing torch provided with at least:

a glass particulate synthesizing torch body having a feedstock gas injection passage formed at the center of its front end, a combustible gas injection passage formed concentrically at the outer circumference of the feedstock gas injection passage, and a plurality of small diameter combustion aid gas injection passages formed in the combustible gas injection passage along the outer circumference of the feedstock gas injection passage and a hood projecting out at the outer circumference of the front end of the torch body, the torch hood satisfying the following relation:

$$0.5 \leq D/L \leq 2.0$$

where,

L is the focal distance, that is, a distance from a point P, to which the small diameter combustion aid gas injection passages are directed and on an extension of the center line of the torch body in front of the torch body, to the front end of the torch body, and D is the hood length, that is, the distance from the front end of the hood to the front end of the torch body.

* * * * *